UNITED STATES PATENT OFFICE.

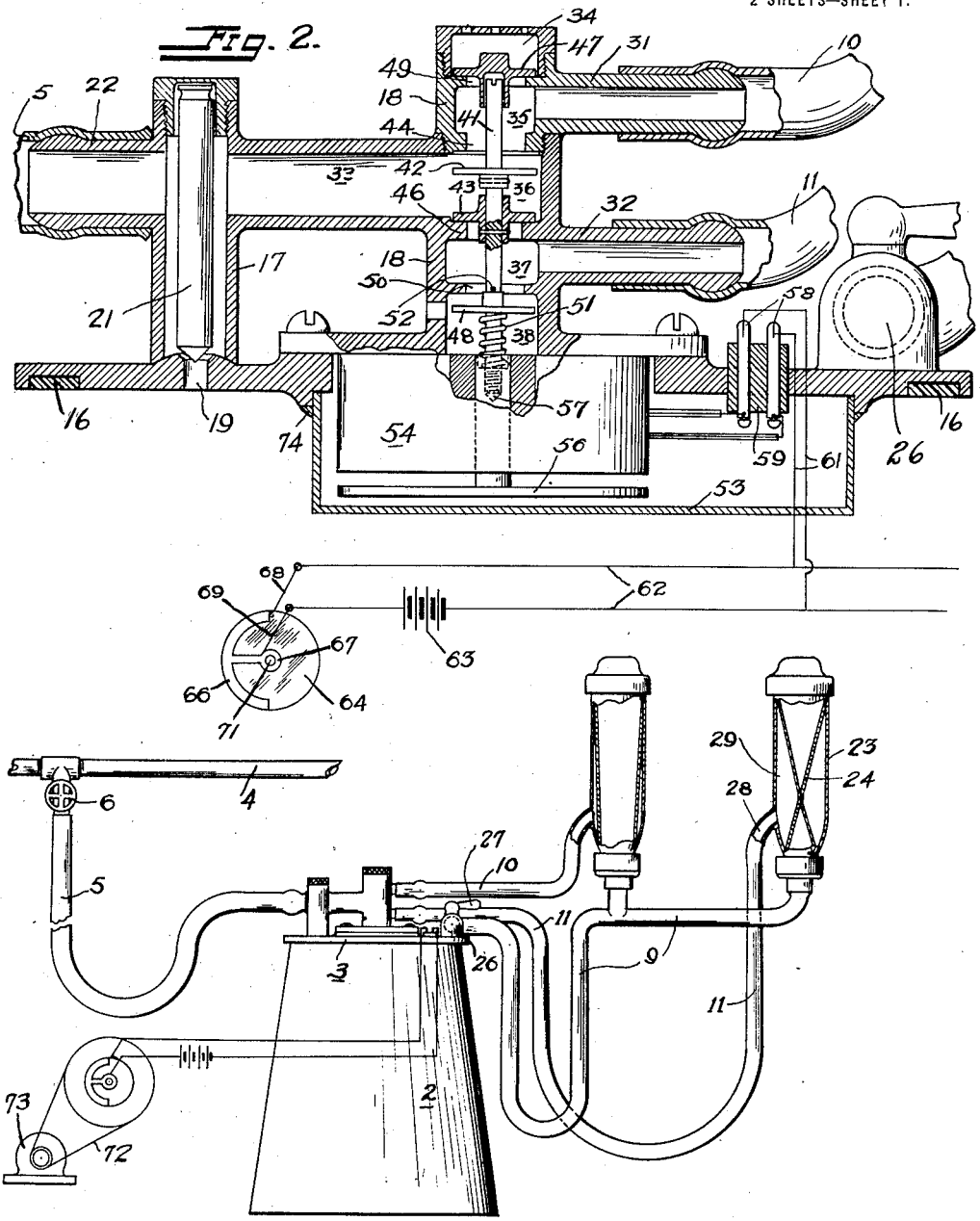

PALMER B. HEWLETT, OF HOLLISTER, CALIFORNIA.

MILKING-MACHINE.

1,393,781.  Specification of Letters Patent.  Patented Oct. 18, 1921.

Application filed June 3, 1919. Serial No. 301,519.

*To all whom it may concern:*

Be it known that I, PALMER B. HEWLETT, a citizen of the United States, and a resident of Hollister, county of San Benito, and State of California, have invented a new and useful Milking-Machine, of which the following is a specification.

My invention relates to apparatus for milking cows.

An object of the invention is to provide a milking machine in which improved means are provided for releasing and establishing the vacuum in the annular chamber surrounding the inner wall of the teat cup.

Another object of the invention is to provide a milking machine in which the teat cup is actuated by means independent of the pressure within the milk pail.

Another object of the invention is to provide a milking machine in which the teat cups are actuated alternately in pairs thus providing a short rest for each pair between milking periods.

The invention possesses other objects and features of advantage, some of which, with the foregoing, will be set forth in the following description of the preferred form of my invention which is illustrated in the drawings accompanying and forming part of the specification. It is to be understood that I do not limit myself to the showing made by the said drawings and description, as I may adopt variations of the preferred form within the scope of my invention as set forth in the claims.

Referring to the drawings:

Figure 1 is an elevation partly in diagrammatic form of the apparatus of my invention, showing a single teat cup in section in each pair of teat cups. Portions of the connections are broken away to reduce the size of the figure.

Fig. 2 is a vertical section through portions of the apparatus shown in Fig. 1, including the pulsator and interrupter for controlling the operation thereof.

Figure 4:
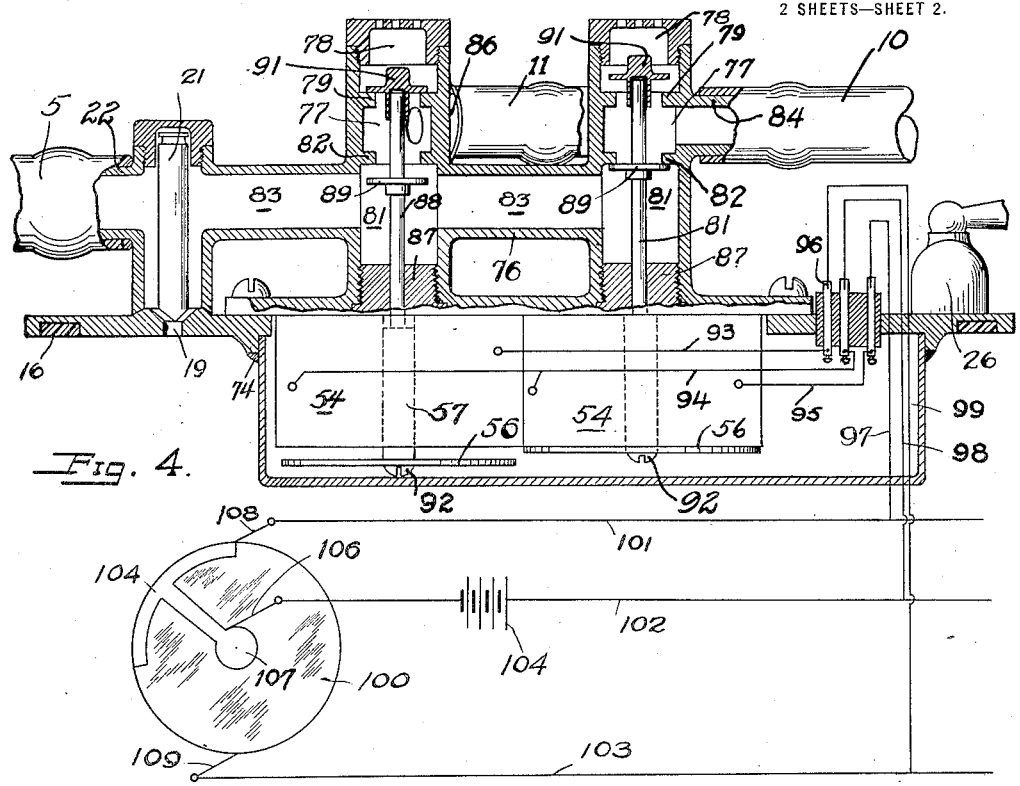
Fig. 4 is a vertical section through portions of the apparatus shown in Fig. 3.

In general terms my milking machine comprises a milking pail 2 surmounted by a closure plate or cover 3 upon which portions of the operating mechanism are arranged and in which means are provided for connecting the interior of the pail to the vacuum line 4 by the flexible conduit 5 controlled by the valve 6. The air in the vacuum line is exhausted by suitable means of well known type not shown herein. A plurality of teat cups connected in pairs, one of each pair being shown in Fig. 1, are connected by a flexible conduit 9 to the interior of the pail, and by a pair of flexible conduits 10 and 11 to the teat cup operating mechanism. Means best shown in Fig. 2 are also provided for regularly interrupting the electric circuit from which the teat cup operating mechanism is energized.

The cover plate 3 is provided with a permanently attached gasket 16 adapting the cover to be seated upon the pail with an air tight joint when the pail is vacuumized. A hollow stud 17, forming part of the casing 18, is alined with the passage 19, formed through the cover, and a check valve 21 is arranged in the stud to control the flow of air through said passage. A nipple 22 upon the stud provides means for attaching the flexible conductor 5 to connect the pail with the vacuum line.

Each of the teat cups comprises a cylindrical casing or shell 23 within which is a flexible casing 24 adapted to inclose the teat. The interior casing is connected to the milk pipe 9, which slips upon a nipple formed on the hollow stud 26 opening into the pail. A valve operated by the handle 27 controls the passage through the stud. During the operation of the machine, the milk pipe 9 which is connected to the interior casing of each of the four teat cups is kept continuously exhausted since it is in direct communication with the vacuumized pail. On the shell 23 of each teat cup is a tube opening into the chamber 29 between the two casings. Two of these tubes are connected by the air line 10 with the nipple 31 formed on the casing 18, and the other two tubes are connected by the air line 11 with the nipple 32 formed on the casing 18.

Means including mechanism constituting a dual two-way valve are provided for alternately connecting each of the air lines 10 and 11 alternately with the vacuum line 4 and the atmosphere so that in each pair of teat cups the chambers 29 are alternately vacuumized and the vacuum released, the chambers of one pair being vacuumized, while the vacuum is released in the other pair. It will be understood that a vacuum is maintained continuously in the milk pipe 9. With a similar vacuum in the chamber 29, the wall of the casing 24 is distended by the inclosed teat from which the milk is sucked. With the release of the vacuum in the chamber 29 the inner casing collapses about the teat closing the casing below the teat and shutting off the sucking action, and at the same time applying a gentle progressive squeezing or massage to the teat, which stimulates the action of the milk glands during the refilling of the milk pocket in the udder. This must occur before the chamber 29 is again vacuumized to permit the casing 24 and the teat to be distended. A double two-way valve is arranged in the casing 18, operating to alternately connect the nipples 31 and 32 alternately with the outer air and with the passage 33 leading to the nipple 22.

The casing 18 incloses a series of five chambers, 34, 35, 36, 37 and 38 arranged one above the other and separated by annular flanges which form valve seats. The upper and lower chambers 34 and 38 are connected to the outer air through apertures in the walls of the casing. The middle chamber 36 is in communication with passage 33 leading to the vacuum line, and the intermediate chambers 35 and 37 are in communication with nipples 31 and 32 respectively. A valve rod or stem 41 extending through the four lower chambers and into the top chamber 34 is provided with a series of valve disks adapted to be seated alternately in pairs on the associated flanges by movement of the rod. Disks 42 and 43 are fixed upon the rod within the chamber 36 and are adapted to be seated alternately on flanges 44 and 46 respectively, and disks 47 and 48 are loosely arranged on the rod in chambers 34 and 38 respectively, and are adapted to be seated alternately on flanges 49 and 50 respectively. The disk 47 slides loosely over the end of the rod and the disk 48 is pressed by the spring 51 against the stop pin 52. When the rod moves upwardly disk 42 closes the passage between the nipple 31 and the vacuum line, and disk 43 rises to establish communication between nipple 32 and the vacuum line. Simultaneously the disk 48 rises to close the passage between the nipple 32 and the chamber 38, and the disk 47 rises to open the passage from the nipple 31 to the chamber 34. The falling of the rod seats the disks 47 and 43 and unseats the disks 42 and 48 as shown in Fig. 2, establishing communication between the nipple 31 and the vacuum line, and between nipple 32 and the open air. Each of the two pipes 10 and 11 is thus controlled by a pair of disks, operated by the rod 41 to alternately connect them with the open air and with the vacuum line 4. The valve disks 47 and 48 can be fixed upon the rod if the flanges forming the valve seats are very accurately spaced. I prefer however to mount one of each pair of disks flexibly upon the rod so as to permit compensation for any inaccuracy of spacing.

Disposed within the tight casing 53 attached to the under side of the cover plate 3 is an electromagnet 54 having an armature plate 56 and core 57. The rod 41 is threaded into the top of the core and the downward movement of the rod and core is limited by the seating of the disk 43. With the energizing of the magnet, the armature is drawn upwardly seating the disks 42 and 48, and unseating the disks 43 and 47. Deënergizing the magnet results in a falling of the core and stem, and the seating of the last named disks and unseating the others, thus opening and closing passages as already explained.

The windings of the magnet are connected to terminals 58 set in a suitable insulating block 59 held in the cover plate 3. A push plug of the usual type (not shown) detachably connects the terminals, by means of conductors 61, with the electric line circuit 62 energized in any suitable way such as by the battery 63. In order to energize and deënergize the magnet to effect the alternate connection of the chambers 29 with the vacuum line and the outer air, an interrupter operating at the required speed is inserted in series in the circuit 62. This interrupter consists of a disk 64 of non-conducting material having a peripheral contact segment 66 electrically connected to the conducting ring 67. Brushes 68 and 69 engage the disks 64 and 67 respectively, which are mounted upon a shaft 71, rotated by the belt 72, driven from any suitable prime mover such as the motor 73, at a speed such that the circuit through the magnet coils is made and broken at the desired rate.

With the making and breaking of the circuit alternately energizing and deënergizing the magnet, the valve stem is operated to connect the chambers 29 of each pair of the teat cups alternately to the open air and to the vacuum line, thus permitting the walls 24 of the teat cups to collapse about the teats and to be distended in the manner already explained, to effect the extraction of the milk.

The valve mechanism and related parts constitute a pulsator acting to effect alternate suction and compression of each teat, very closely simulating the action of a calf, which action may be taken to be the perfect and natural milking method. The timing of the pulsations is preferably forty-eight to fifty per minute. The pulsator is without parts easily injured, or clogged by milk which may accidentally get into the air passages, and all portions are readily removable for the purpose of cleaning. After the assemblage of all the parts the casing 53 is preferably permanently attached as by solder 74 to the cover so that milk or moisture can not by any chance find entrance to the casing.

After the pail is full of milk the valve 6 and the valve controlled by handle 27 are closed and the flexible conduits and the push plug disconnected, when the pail may be carried out, the cover plate being sealed to the pail until the release of the vacuum within the pail by movement of the handle 27.

As many pails as desired may be connected to the vacuum line 4 and electric line 62, and it will be clear from the above that the regularity of action of the pulsator for each set of teat cups is unaffected by variations in the pressure within the vacuum line or pails, or by the connection or disconnection of other pails.

Figure 3:
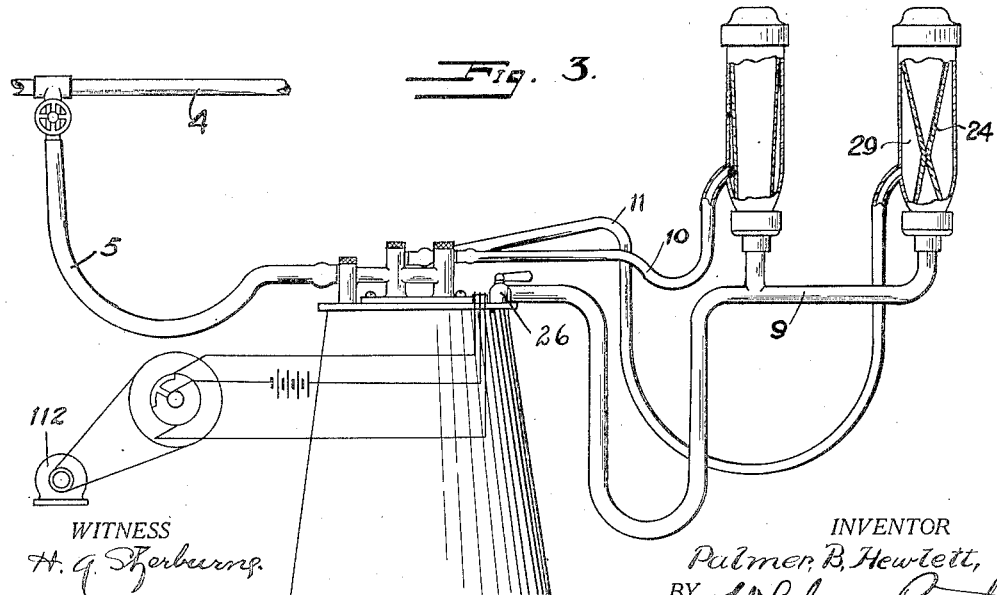
Fig. 3 is an elevation partly in diagrammatic form of a modified arrangement of the apparatus.

In the apparatus just described the interrupter contact segment 66 spans an arc of 180°, but I have found that in some cases it is desirable to make the segment cover a smaller arc, so as to effect a longer squeeze and a shorter suction pull on the teats, and in Figs. 3 and 4 I have shown a modified form of my milking machine embodying means for accomplishing this result. In this construction the dual two-way valve is arranged with the valve disks on two stems, and means are provided for coördinating the operation of these stems.

The casing 76 is formed with two chambers 77, each separated from an upper chamber 78 by a flange 79, and from a lower chamber 81 by a flange 82. The upper chambers 78 are in communication with the outer air through apertures in the upper wall of the casing, and the lower chambers 81 communicate with the passage 83 opening into the nipple 22 connected to the vacuum line 4 by conductor 5. The air lines 10 and 11 are connected respectively to nipples 84 and 86, formed on the casing, one in communication with each chamber 77.

Slidably disposed in each of the plugs 87 closing the bottom of the chambers 81, is a valve rod or stem 88 provided with a fixed valve disk 89 adapted to seat on the flange 82 when the stem is moved upwardly. The upper end of the stem carries the disk 91 loosely mounted thereon and adapted to seat on the flange 79 when the stem falls to its lower position. Reciprocation of each valve stem therefore alternately connects the associated nipple with the chambers 78 and 81, that is, with the outer air and the vacuum line.

Arranged in the casing 53 are two electro-magnets 54, one for each valve rod. A screw 92 in the end of the core 57 limits the downward movement of the core by engagement with the casing and the upper end of the core engages the lower end of the associated valve rod 88. When either magnet is energized, its armature is drawn upwardly, pushing up the associated stem and closing the passage between the nipple and the vacuum line, and opening the passage between the nipple and the outer air. Deënergizing either magnet permits its core and the associated stem to fall, closing the passage to the outer air and establishing the passage to the vacuum line.

Means are provided for energizing each magnet for a short period and then deënergizing for a longer period, so that the squeezing action upon the teats is prolonged for a period greater than the suction thereon, it being remembered that the squeezing action is effected by the collapse of the inner casing which results when the vacuum, in the air lines 10 and 11, is released.

The magnets 54 are connected by conductors 93, 94 and 95 to terminals 96, and a push plug detachably connects the terminals by means of conductors 97, 98 and 99 to the line circuit comprising the three conductors 101, 102 and 103, energized by the battery 104. The conductors 94, 98 and 102 comprise a common return for the two magnet circuits in both of which an interrupter operating at the desired speed is connected in series. The interrupter is similar to that already explained except that the segment 104 spans an arc of about 100°. A brush 106 connects the conductor 102 to the conducting ring 107 and brushes 108 and 109 spaced about 180° apart and connected to conductors 101 and 103 respectively, engage the periphery of the interrupter disk 100. The interrupter is driven by the motor 112 at the desired speed and operates to alternately close the circuits through the two magnets, with the result that the two pairs of teat cups are alternately operated in the manner previously explained except that the suction period is shortened and the squeezing period lengthened.

I claim:

1. In a milking machine, a milk receptacle cover provided with a chambered casing comprising a pair of outer chambers open to the atmosphere, a pair of intermediate chambers, each connected with a teat cup and a vacuum chamber connected with a source of vacuum, valves controlling communication between each intermediate chamber and the vacuum chamber and the respective outer chambers, and electro-magnetic means for so actuating said valves in timed relation that each intermediate chamber is alternately opened to the atmosphere and to said vacuum chamber, and the timing being such that the intermediate chambers are opened to the atmosphere and said vacuum chamber in alternation with respect to each other.

2. In a milking machine, the combination of a milk receptacle cover, a chambered casing comprising a vacuum chamber, a pair of intermediate chambers and a pair of atmospheric air chambers, a valve interposed between each intermediate chamber and its respective atmospheric chamber, a valve interposed between each intermediate chamber and said vacuum chamber, and electro-magnetic means for actuating said valves so that communication is established and shut off between the vacuum chamber and said intermediate chambers in alternation and between said atmospheric chambers and said intermediate chambers in alternation, the actuation being such that when one intermediate chamber is opened to vacuum and closed from atmosphere, the other intermediate chamber is closed from vacuum and opened to atmosphere.

3. In a milking machine, the combination of a milk receptacle cover provided with a chambered casing including a pair of atmospheric air chambers, a pair of intermediate chambers and a vacuum chamber, a pair of valves for each intermediate chamber adapted to be alternately opened and closed to establish communication between each intermediate chamber and the atmosphere and said vacuum chamber in alternation, and electro-magnetic means for operating said valves so that the intermediate chambers are alternately in communication with said vacuum chamber.

4. In a milking machine, the combination of a milk receptacle cover, a plurality of chambers arranged thereon comprising a pair of atmospheric air chambers, a pair of intermediate chambers and a vacuum chamber, a pair of valves for each intermediate chamber, one of the valves of each pair being movable relatively to the other, and electro-magnetic means for operating all of said valves to cause a valve of each pair to be closed when the other is opened, the pairs of valves being arranged to establish communication between the vacuum chamber and said intermediate chambers in alternation.

5. In a milking machine, the combination of a milk receptacle cover, a plurality of chambers mounted thereon, a source of vacuum connected with one of said chambers, two of said chambers being connected with teat cups and two chambers being open to atmosphere, four valves controlling communication between the various chambers, and electro-magnetic means for actuating said valves so that each teat cup chamber communicates alternately with said vacuum chamber and with the atmosphere, communication between the vacuum chamber and said teat cup chambers being established in alternation.

In testimony whereof, I have hereunto set my hand at San Francisco, California, this 22nd day of May 1919.

PALMER B. HEWLETT.